United States Patent
Smith

(10) Patent No.: US 8,460,116 B1
(45) Date of Patent: Jun. 11, 2013

(54) SLIP JOINT AND METHOD FOR ASSEMBLING THE SAME

(75) Inventor: Johnny N Smith, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/311,934

(22) Filed: Dec. 6, 2011

(51) Int. Cl.
*F16C 3/03* (2006.01)

(52) U.S. Cl.
USPC .................................. 464/167; 29/898.03

(58) Field of Classification Search
USPC ............... 464/146, 167, 168; 384/44, 49, 52, 384/55; 29/898.03
See application file for complete search history.

(56) References Cited

U.S. PATENT DOCUMENTS

| | | | |
|---|---|---|---|
| 2,503,009 A * | 4/1950 | Thomson | ............... 29/898.03 X |
| 3,003,827 A * | 10/1961 | Hentschke | ...................... 384/49 |
| 3,610,709 A | 10/1971 | Allen | |
| 3,997,382 A | 12/1976 | Tanaka | |
| 4,176,888 A | 12/1979 | Teramachi | |
| 4,322,062 A | 3/1982 | Aleck | |
| 4,378,135 A | 3/1983 | Enen | |
| 4,406,502 A | 9/1983 | Teramachi | |
| 4,473,317 A | 9/1984 | Bolang | |
| 4,497,670 A | 2/1985 | Siga | |
| 4,600,063 A | 7/1986 | Beasley | |
| 4,695,170 A | 9/1987 | Teramachi | |
| 4,981,459 A | 1/1991 | Klinkenberg | |
| 5,107,942 A | 4/1992 | Radford | |
| 5,230,658 A | 7/1993 | Burton | |
| 5,540,547 A | 7/1996 | Cole | |
| 5,829,882 A | 11/1998 | Ng | |
| 5,868,517 A | 2/1999 | Aoki | |
| 6,029,342 A | 2/2000 | Armenoff | |
| 6,123,623 A | 9/2000 | Sugiyama | |
| 6,189,864 B1 | 2/2001 | Crow | |
| 6,264,395 B1 | 7/2001 | Allamon | |
| 6,634,078 B1 | 10/2003 | Breese | |
| 6,805,637 B2 | 10/2004 | Daenzer et al. | |
| 6,893,353 B2 | 5/2005 | Dutkiewicz et al. | |
| 6,908,228 B2 | 6/2005 | Dalessandro et al. | |
| 7,341,525 B2 * | 3/2008 | Zernickel | ...................... 464/168 |

FOREIGN PATENT DOCUMENTS

WO 94/16238 7/1994

* cited by examiner

*Primary Examiner* — Gregory Binda
(74) *Attorney, Agent, or Firm* — Marshall & Melhorn, LLC

(57) ABSTRACT

A slip joint comprising, a female portion comprised of four axially extending segments. The segments together create an outer perimeter. Each of the combined segments together form an inner surface of the female portion and each has its own ball tracks extending substantially the length of the female portion. A unitary male portion has an outer surface defined by a plurality of axially extending ball tracks. A unitary cage is located radially outward from the male portion and radially inward from the female portion. The cage has a plurality of ball apertures with balls located in the ball apertures. The balls are in contact with both the ball tracks in the male and female portions for selective movement of the male portion with respect to the female portion. A tube member is in direct radial outer contact substantially entirely along the outer perimeter of the female portion.

20 Claims, 4 Drawing Sheets

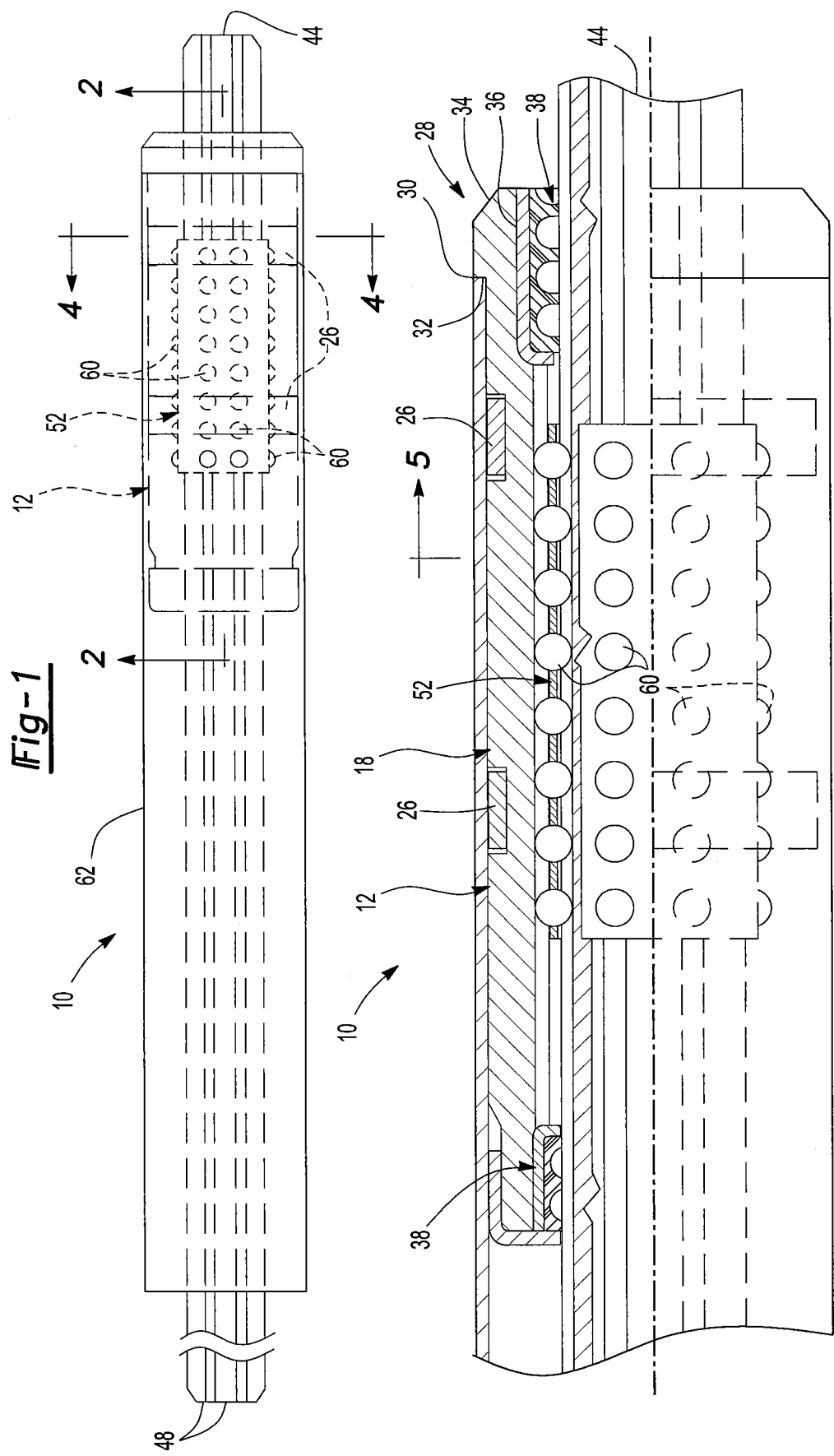

SLIP JOINT AND METHOD FOR ASSEMBLING THE SAME

RELATED APPLICATIONS

None

FIELD OF THE INVENTION

The present invention relates to an improved structure for a rolling element spline type of slip joint for use in a vehicle.

BACKGROUND OF THE INVENTION

Slip joints are used for transmitting rotational force or torque between telescoping members, while accommodating relative axial movement there between. This is most commonly used in vehicle drive train systems. Drive train systems are generally used for generating power from a source and for transferring such power from the source to a driven mechanism.

The typical drive train system includes a driveshaft assembly that is connected between an output shaft of an engine/transmission assembly and an input shaft of an axle assembly. The driveshaft assembling includes universal joints which provide a rotational driving connection from an output shaft of an engine/transmission assembly to an input shaft of an axle assembly, while accommodating a limited amount of angular misalignment between the rotational axes.

Not only must the drive train assembly accommodate a limited amount of angular misalignment between the engine/transmission assembly and the axle assembly, but it must also accommodate a limited amount of relative axial movement. The axial movement frequently occurs when the vehicle is operated. Typically slip joints are used to address the issue of axial movement. A typical slip joint includes male and female telescoping members. The male and female members each have a plurality of extending splines. To assemble the slip joint, the male member is inserted within the female member such that the splines of the male member cooperate with the splines of the female member. The cooperating splines of the respective members provide a rotational driving connection though the slip joint, while also permitting a limited amount of relative axle movement there between.

In the past, the splined members have been formed by a machining process, wherein material was removed from the members. While this process is satisfactory, is has been found to be somewhat inefficient. Thus it would be desirable to provide an improved method for manufacturing the splined members. It would be advantageous to produce a female member that has a simple profile that is easily controlled in a high volume production environment.

SUMMARY OF THE INVENTION

A slip joint has a female portion comprised of four axially extending segments of substantially equal length. Two of the segments comprise a first pair of identical segments and two other segments comprise a second pair of identical segments, different than the first pair. The segments in the first pair comprise a greater portion of an outer perimeter of the female portion than the segments in the second pair. The segments in the first pair alternate with the segments in the second pair, and the four segments together create an outer perimeter with spaced apart grooves extending circumferentially around all four segments of the female portion. The outer perimeter also comprises a radially extending tube stop. Each of the combined segments together form an inner surface of the female portion and each of the segments have their own ball tracks extending axially, substantially the length of the female portion. A unitary male portion has an outer surface defined by a plurality of axially extending ball tracks, the same number as the ball tracks on the female portion. The male portion and the female portion ball tracks are aligned with one another. The male portion is located radially inward the female portion inner surface. A unitary cage is located radially outward from the male portion outer surface and radially inward from the female portion inner surface. The cage has an inner surface and an outer surface. The cage also has a plurality of ball apertures each extending entirely through from the inner surface to the outer surface. The ball apertures are aligned in rows complimentary to the ball tracks in the male and female portions. A plurality of balls are located in the plurality of ball apertures. The balls are in contact with both the ball tracks in the male and female portions for selective movement of the male portion with respect to the female portion. A tube member having an outer surface and an inner surface, which is in direct radial contact substantially entirely along the outer perimeter of said female portion. The tube member has an end directly abutting an interior edge of the tube stop on the female portion.

Various objects and advantages of this invention will become apparent to those skilled in the art from the following detailed description of the preferred embodiments, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 is a side view of one embodiment of the present invention;

FIG. 2 is a partial cut-away view of a portion of the embodiment of FIG. 1 along line 2-2;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 3:
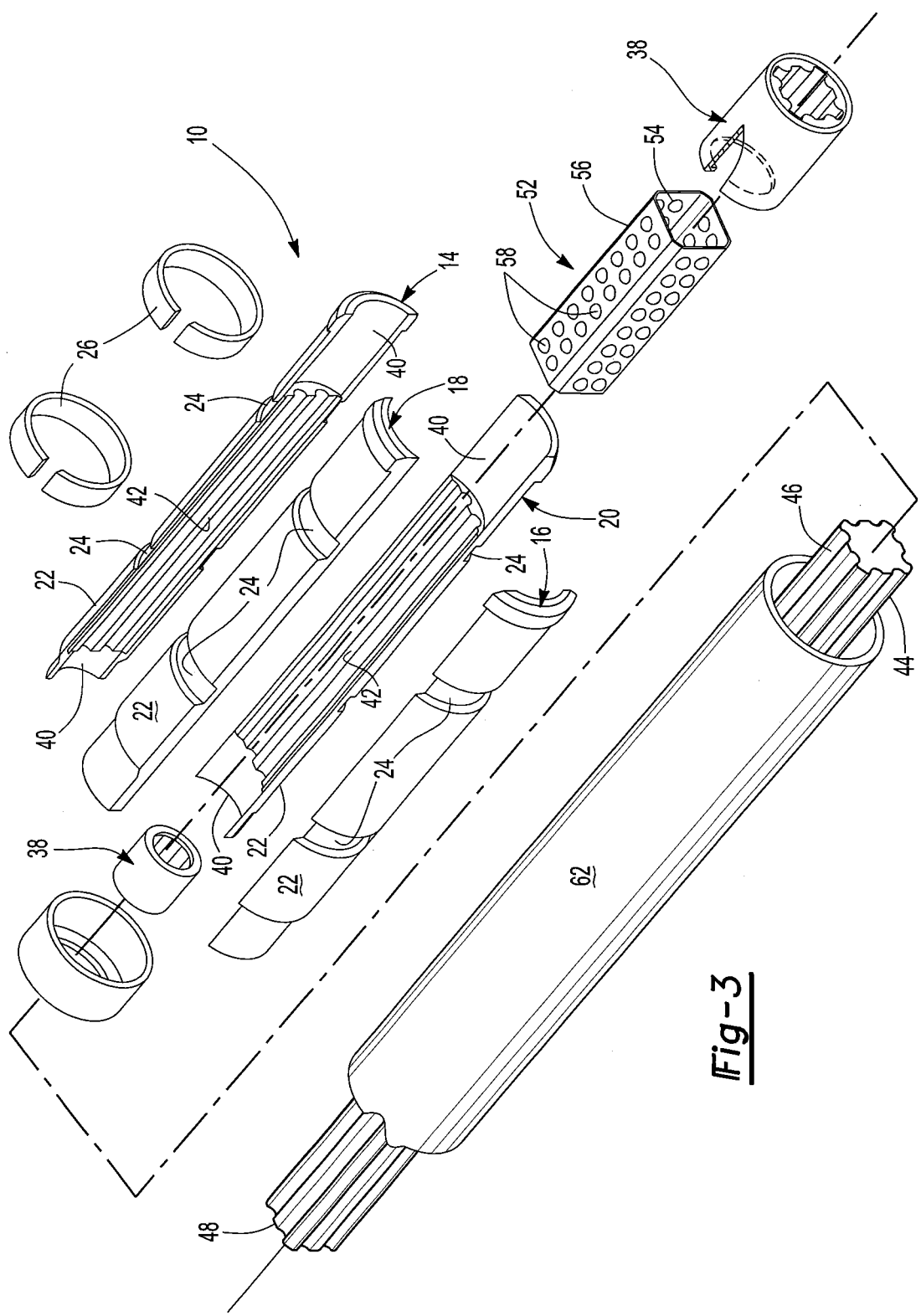
FIG. 3 is a perspective exploded view of the embodiment of FIG. 2.

Referring now to FIGS. 1 and 2, a slip joint 10 is depicted having a segmented female portion 12. The female portion 12 of the slip joint 10, as shown in detail in FIG. 3, is comprised of four axially extending segments 14, 16, 18, 20 of substantially equal length. It is also within the scope of the present invention for there to be more or less axially extending segments as may be required for a specific application.

Figure 4:
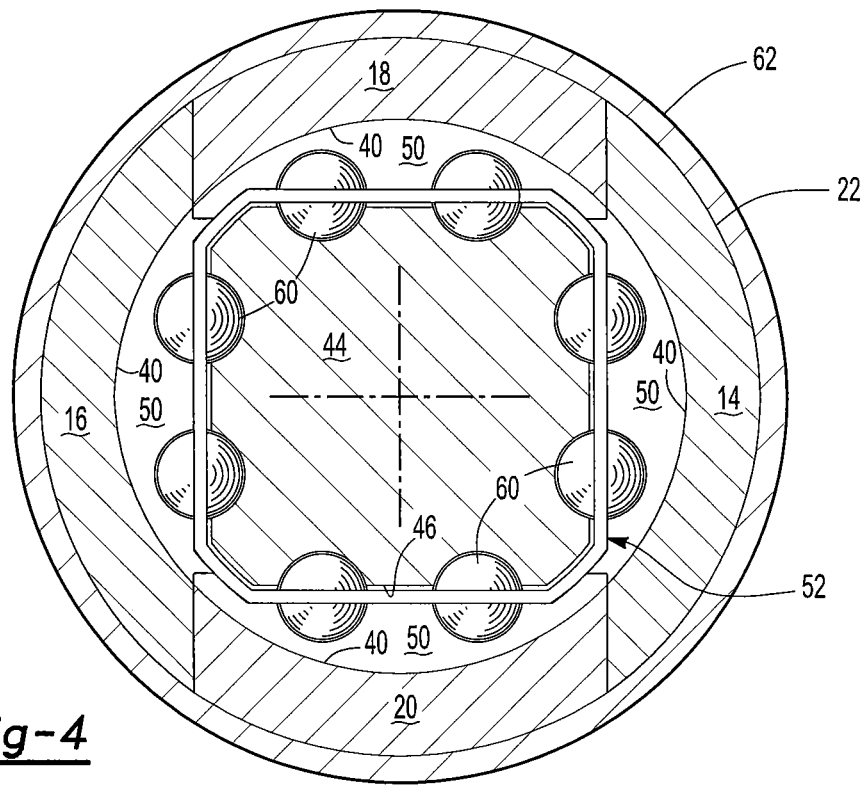
FIG. 4 is a cross-sectional view of a portion of the embodiment of FIG. 1 along line 4-4.
Figure 5:
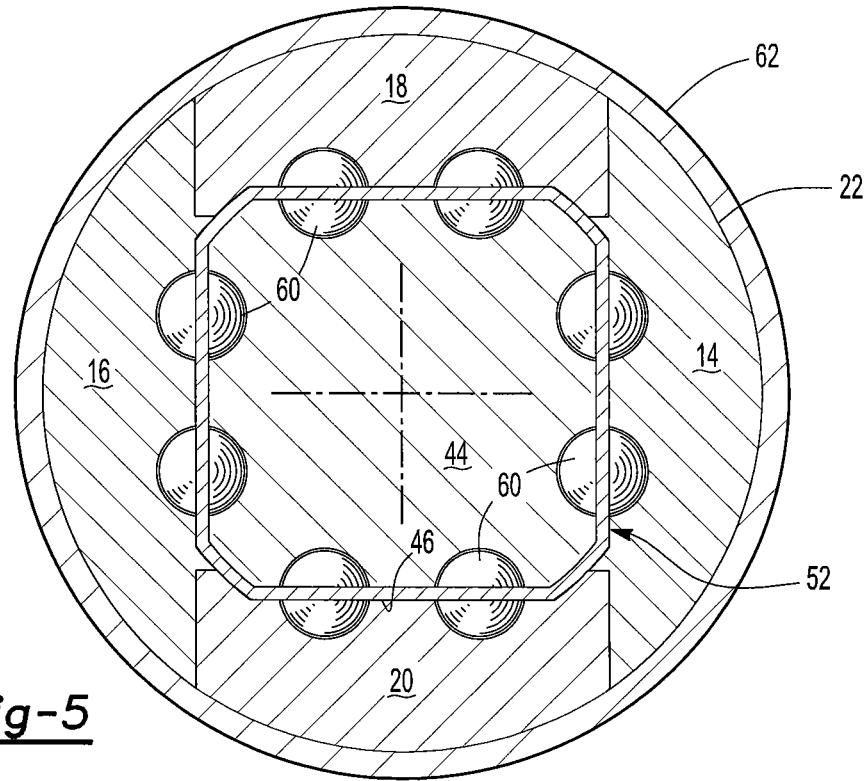
FIG. 5 is a cross-sectional view of a portion of the embodiment of FIG. 2 along line 5-5.

As shown in FIGS. 3, 4, and 5, two of the segments 14, 16 comprise a first pair of identical segments and two other segments 18, 20 comprise a second pair of identical segments different than the first pair. Once assembled in the slip joint 10, the segments 14, 16 in the first pair do not directly contact one another and the segments 18, 20 in the second pair do not directly contact one another. Accordingly, the segments in the first pair 14, 16 alternate with the segments in the second pair 18, 20 in the slip joint 10. The four segments 14, 16, 18, 20 together create an outer perimeter 22. The segments in the first pair 14, 16 comprise a greater portion of the outer perimeter 22 of the female portion 12 than the segments in the second pair 18, 20, as depicted in FIGS. 4 and 5.

The outer perimeter 22 of the female portion 12 is substantially smooth and curvilinear with the exception of at least one groove 24 extending circumferentially around all four of the segments 14, 16, 18, 20 of the female portion 12, and a tube stop 28. As shown in FIGS. 2 and 3, at least two spaced apart grooves 24 are shown, however, it is within the scope of the invention for there to be more or less grooves as needed.

Figure 6:
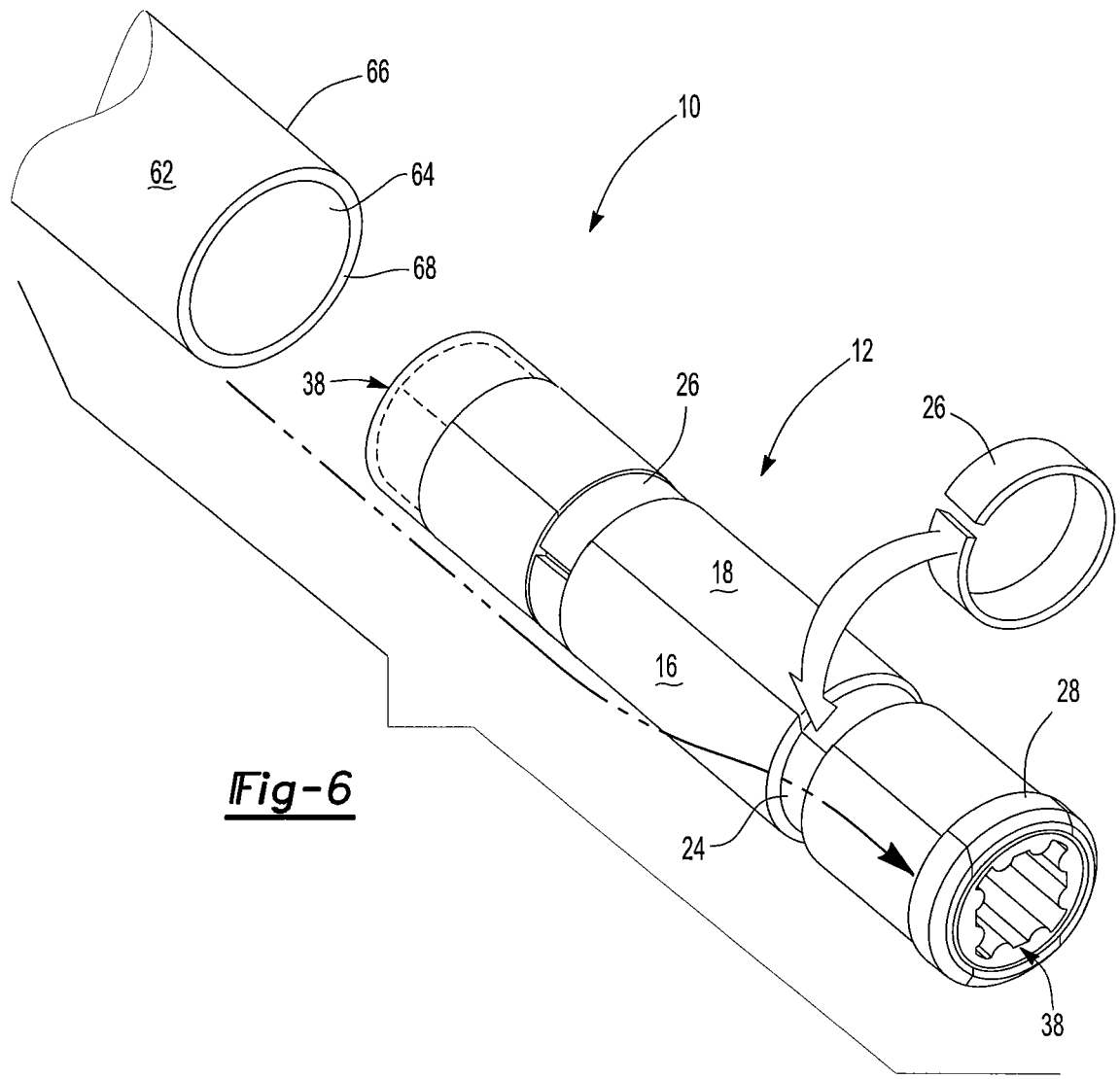
FIG. 6 is an assembled view of the embodiments depicted above.

As shown in FIGS. 3 and 6, circumferential members 26 are selectively located in the grooves 24. The circumferential members 26 may be C-shaped clamps that are compressed within the grooves 24 to secure the segments 14, 16, 18, 20 together. It should also be understood that there are other means of securing the segments together which may include but is not limited to mechanical fasteners and/or welding and/or adhesives and/or male/female couplings and/or keyways, to name a few.

One end on each of the segments 14, 16, 18, 20, as depicted in FIGS. 2 and 3, comprises a unitary radially extending tube stop 28. The tube stop 28 extends radially outward from the outer perimeter 22 forming a 90 degree angle 30 along an interior abutting edge 32. An exterior sloped edge 34 of the tube stop 28 is provided, as best shown in FIG. 2. Also as shown in FIG. 2, an inner surface 36 of the tube stop 28 comprises a cut-out area for accepting a seal assembly 38. The seal assembly 38 is located radially inward from the tube stop 28 and the exterior sloped outer edge 34.

Each of the combined segments 14, 16, 18, 20 together form an inner surface 40 of the female portion 12, and each of the segments 14, 16, 18, 20 have their own balls tracks 42, as shown in FIG. 3, extending substantially the length of the female portion 12. The ball tracks 42 are parallel with the axis of the female portion 12. The ball tracks 42 are also parallel to one another and equally spaced about the female portion 12. As depicted in FIGS. 4 and 5, each segment 14, 16, 18, 20 comprises two tracks each. However, it is within the scope of the invention for there to be more or less tracks in each segment.

The segments 14, 16, 18, 20 are produced with complementary mating surfaces with each other, and may be cold formed, forged, extruded or powered metal. By producing the female portion 12 in this manner, it is possible to harden and grind the working surfaces (inner surface 40 and ball tracks 42), economically, which will improve durability. Each segment 14, 16, 18, 20 has a simple profile that is easily controlled in a high volume production environment.

A unitary male portion 44, as shown in FIG. 3, comprises an outer surface 46 defined by a plurality of axially extending, circumferentially spaced apart ball tracks 48. The ball tracks 48 extend substantially the length of the male portion 44. The ball tracks 48 are parallel with the axis of the male portion 44. The ball tracks 48 are also parallel to one another and equally spaced and aligned with the ball tracks 42 of the female portion 12. The ball tracks 48 are equal in number to the ball tracks 42 of the female portion 12.

The male portion 44 is located radially inward of the female portion inner surface 40. The outer surface 46 of the male portion 44 and the inner surface 40 of the female portion 12 maintain a substantially constant gap 50 between the two surfaces, as depicted in FIG. 4. The gap 50 is substantially equidistant along the length of the male and female portions 44, 12.

As depicted in FIGS. 3 and 4, a unitary cage 52 is located radially outward from the male portion outer surface 46 and radially inward the female portion inner surface 40, and within the gap 50. The cage 52 has an inner surface 54 and an outer surface 56. A plurality of ball apertures 58 each extends entirely through from the inner surface 54 to the outer surface 56 of the unitary cage 52. The ball apertures 58 are aligned in rows complementary to the ball tracks 48 in the male portion 44 and the ball tracks 42 in the female portion 12.

A plurality of balls 60, as depicted in FIGS. 2, 4 and 5, are located in the plurality of ball apertures 58, wherein the balls 60 are in contact with the ball tracks in both the male and the female portions 48, 42 for selective axial movement of the male portion 44 with respect to the female portion 12.

As depicted in FIG. 6, a tube member 62 having an inner surface 64 and an outer surface 66 is provided. The inner surface 64 is in direct radial contact substantially entirely along the outer perimeter 22 of the female portion 12, and ending at and abutting the interior abutting edge 32 of the tube stop 28. The inner surface 64 and the outer surface 66 of the tube member 62 is substantially parallel and coplanar with a top edge of the tube stop 28.

As shown in the assembled view of FIG. 6, the slip joint comprises the first pair of identical segments 14, 16 alternated and interlocked between the second pair of identical segments 18, 20. The joined segments 14, 16, 18, 20 form the outer perimeter 22 and the inner surface 40 of the female portion 12. Each of the segments 14, 16, 18, 20 comprises ball tracks 42 extending substantially the length of the female portion 12.

The male portion 44 is located radially inward of the inner surface 40 of the female portion 12. The male portion 44 comprises a plurality of ball tracks 48 extending substantially along the outer surface 46 of the male portion 44. The ball tracks 42 of the female portion 12 and the ball tracks 48 of the male portion 44 are aligned with one another so that the male and female portions 44, 12 may selectively move with respect to one another by locating a cage 52 between them.

The cage 52 comprises a plurality of ball apertures 58 for holding a plurality of balls 60 that roll within the ball tracks 42 of the female portion 12 and the ball tracks 48 of the male portion 44.

The joined segments 14, 16, 18, 20 located racially outward of the male portion 44 are pressed within a tube member 62 so that the outer perimeter 22 of the female portion 12 is in direct contact with the inner surface 64 of the tube member 62. This provides the slip joint 10 with the added hoop strength it needs to transmit torque.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A slip joint, comprising:
 a female portion comprised of four axially extending segments of substantially equal length, wherein two segments comprise a first pair of identical segments and two other segments comprise a second pair of identical segments different than said first pair, wherein said segments in said first pair comprise a greater portion of an outer perimeter of said female portion than said segments in said second pair and wherein said segments in said first pair alternate with said segments in said second pair, said four segments together creating said outer perimeter with spaced apart grooves extending circumferentially around all four segments of said female portion, said outer perimeter also comprising a unitary radially extending tube stop, wherein each of said combined segments together form an inner surface of said female portion and wherein each of said segments each have at least one axially extending ball track, said ball track extends substantially the length of said female portion;

a unitary male portion having an outer surface defined by a plurality of axially extending ball tracks, said male portion located radially inward said female portion inner surface;

a unitary cage located radially outward from said male portion outer surface and radially inward said female portion inner surface, said cage having an inner surface and an outer surface, wherein said cage has a plurality of ball apertures each extending entirely through from said inner surface to said outer surface;

a plurality of balls located in said plurality of ball apertures, said balls in contact with both of said ball tracks in said male and female portions for selective movement of said male portion with respect to said female portion; and a tube member.

2. A slip joint according to claim 1, wherein there is the same number of axially extending ball tracks on said male portion as ball tracks on said female portion.

3. A slip joint according to claim 1, wherein said male portion and said female portion ball tracks are aligned with one another.

4. A slip joint according to claim 1, wherein a gap is located between said outer surface of said male portion and said inner surface of said female portion.

5. A slip joint according to claim 1, wherein said ball apertures are aligned in rows complementary to said ball tracks in said male and female portions.

6. A slip joint according to claim 1, wherein said tube member has an inner surface and an outer surface, said inner surface being in direct radial contact substantially entirely along said outer perimeter of said female portion.

7. A slip joint according to claim 1, wherein said tube member has an end directly abutting an interior edge of said tube stop.

8. A slip joint, comprising:
a female portion comprised of four axially extending segments of substantially equal length, wherein two segments comprise a first pair of identical segments and two other segments comprise a second pair of identical segments different than said first pair, wherein said segments in said first pair comprise a greater portion of an outer perimeter of said female portion than said segments in said second pair and wherein said segments in said first pair alternate with said segments in said second pair, said four segments together creating said outer perimeter with spaced apart grooves extending circumferentially around all four segments of said female portion, said outer perimeter also comprising a unitary radially extending tube stop, wherein each of said combined segments together form an inner surface of said female portion and wherein each of said segments each have at least one axially extending ball track, said ball track extends substantially the length of said female portion;

a unitary male portion having an outer surface defined by a plurality of axially extending ball tracks, said ball tracks are parallel with the axis of the male portion, are parallel to one another, and are aligned with said ball tracks on said female portion, said male portion located radially inward said female portion inner surface;

a unitary cage located radially outward from said male portion outer surface and radially inward said female portion inner surface, said cage having an inner surface and an outer surface, wherein said cage has a plurality of ball apertures each extending entirely through from said inner surface to said outer surface, said ball apertures aligned in rows complementary to said ball tracks in said male and female portions;

a plurality of balls located in said plurality of ball apertures, said balls in contact with both of said ball tracks in said male and female portions for selective movement of said male portion with respect to said female portion; and a tube member having an inner surface and an outer surface in direct radial outer contact substantially entirely along said outer perimeter of said female portion, said tube member having an end directly abutting an interior edge of said tube stop.

9. A slip joint according to claim 8, wherein said segments in said first pair do not directly contact one another and said segments in said second pair do not directly contact one another.

10. A slip joint according to claim 8, wherein at least one circumferential member is selectively located in said outer perimeter of same female portion spaced apart grooves to secure said four segments together.

11. A slip joint according to claim 8, wherein a gap is located between said outer surface of said male portion and said inner surface of said female portion.

12. A slip joint according to claim 8, wherein said inner surface and said outer surface of said tube member define a substantially constant thickness between them.

13. A method of assembling a slip joint, comprising:
providing a first pair of identical segments which together comprise only part of a circumference of a female portion, wherein at least one ball track extends substantially along inner surfaces of each of said first pair of identical segments;

providing a second pair of identical segments which together comprise only part of said circumference of said female portion, wherein at least one ball track extends substantially along inner surfaces of each of said second pair of identical segments;

joining said first pair of identical segments with said second pair of identical segments to comprise said circumference of said female portion, wherein said first pair of identical segments comprise a larger percentage of said circumference than said second pair of identical segments;

locating said joined first and second pair of segments within a tube member so that an outer surface of said joined segments is in direct contact with an inner surface of said tube member;

locating a male member radially inward said ball tracks of said first and second pair of segments, said male member having ball tracks extending substantially along an outer surface of said male member and in alignment with said ball tracks of said first and second pair of segments;

permitting said male and female members to selectively move axially with respect to one another by locating a cage between them, said cage holding a plurality of balls that roll within said ball tracks of said male and female members.

14. A method of assembling a slip joint according to claim 13, wherein said second pair of identical segments do not directly contact one another and said first pair of identical segments do not directly contact one another.

15. A method of assembling a slip joint according to claim 13, wherein circumferential members are selectively located around said circumference of said female portion to secure said segments together.

16. A method of assembling a slip joint according to claim 13, wherein there is the same number of axially extending ball tracks on said male portion as ball tracks on said female portion.

17. A method of assembling a slip joint according to claim 13, wherein said male portion and said female portion ball tracks are aligned with one another.

18. A method of assembling a slip joint according to claim 13, wherein a gap is located between the outer surface of the male portion and the inner surface of the female portion.

19. A method of assembling a slip joint according to claim 13, wherein said cage has a plurality of ball apertures aligned in rows complementary to said ball tracks in said male and female portions.

20. A method of assembling a slip joint according to claim 13, wherein said inner surface of said tuber member and an outer surface of said tube member define a substantially constant thickness between them.

* * * * *